DIGITAL-TO-ANALOGUE CONVERTER

Filed July 28, 1951 2 Sheets-Sheet 1

INVENTOR.
SIEGFRIED HANSEN.
BY Nicholas T Volsk
atty.

Sept. 20, 1955 S. HANSEN 2,718,634

DIGITAL-TO-ANALOGUE CONVERTER

Filed July 28, 1951 2 Sheets-Sheet 2

INVENTOR.
SIEGFRIED HANSEN
BY Nicholas T Volsk
atty.

United States Patent Office 2,718,634
Patented Sept. 20, 1955

2,718,634

DIGITAL-TO-ANALOGUE CONVERTER

Siegfried Hansen, Los Angeles, Calif., assignor, by mesne assignments, to Hughes Aircraft Company, a corporation of Delaware Application July 28, 1951, Serial No. 239,077
7 Claims. (Cl. 340—347)

Figure 1:
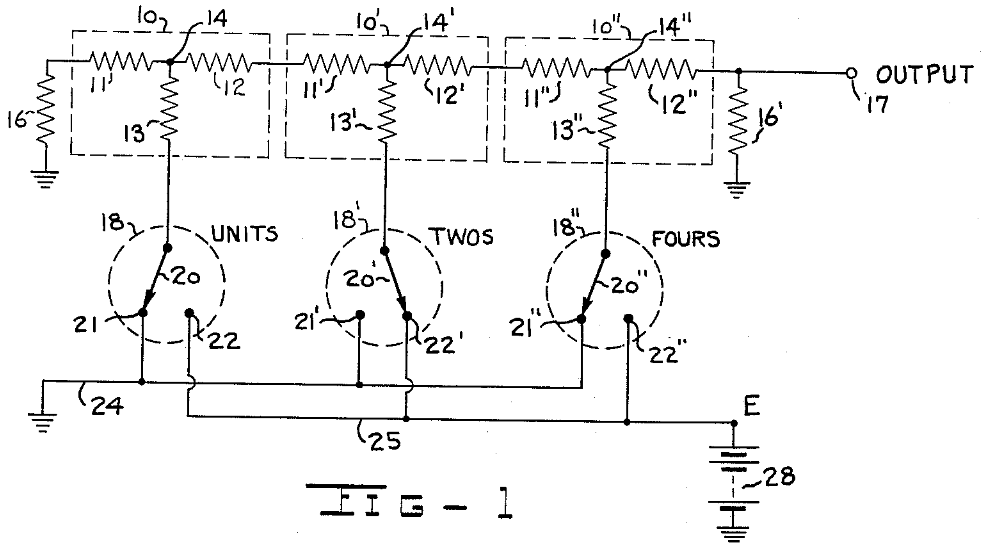

This invention relates to a digital-to-analogue converter, and, in particular, to a converter which transforms a series of signals or potentials representing a digital number into an analogue potential whose magnitude is proportional to the digital number represented.

One important use of a converter of the type contemplated by this invention is in its combination with a digital computer whose output signals, representing the digits, respectively of a digital number, are utilized to control the operation of various electrical and mechanical devices. The output signals are incapable of performing the necessary control functions by themselves, but, instead, must first be converted into a more usable form, as for example, a potential whose magnitude is precisely related to the original digital number. Another important use for a digital-to-analogue converter is found in supplying analogue potentials for input to an analogue computer. In this use, the quantities to be computed were originally decimal numbers which must be converted into analogue form before being available for computation purposes by the computer.

In the past, several devices have been utilized to secure digital-to-analogue conversion, but each has suffered either a lack of accuracy or extreme complexity. A discussion of prior conversion systems is found on pages 393 to 396 of the book, "High-Speed Computing Devices" by the staff of Engineering Research Associates, published by McGraw-Hill Book Company in 1950. One system, performing an analogue conversion of binary signals, utilizes the exponential time delay of an R-C circuit and requies accurate timing of the input pulses. The magnitude of the input pulses is very critical to insure accuracy of the conversion, and the precise timing required between the arrival of such pulses from the computer system limits the type of computer systems available for use therewith. The accuracy of the R-C circuit also imposes an additional limitation on the converted output signal accuracy and the speed of conversion is inherently limited by the time interval necessary between the input pulses.

In contrast to the converter described in the preceding paragraph which is adapted to receive informaton serially, a converter for receiving information in parallel is disclosed in "Theory and Techniques for Design of Electronic Digital Computers, vol. III;" The University of Pennsylvania, Moore School of Electrical Engineering, Philadelphia, Pennsylvania, June 30 1948. That reference discloses in pages 33–11 to 33–13 and in Figure 7 of drawing PX–O–144A a system whereby constant current sources are used to represent the digital information, each current source being weighted according to the digit which it represents. An attenuator network having a utilization device connected to its output receives at different sections throughout its length the currents representing the respective digits. The potential delivered to the utilization device has an analogue value corresponding to the input digital information. A shortcoming of this converter is that two amplifiers and their associated circuitry are required to provide the constant current representation of each digit.

This invention discloses an extremely simple, yet totally reliable, digital-to-analogue converter, which essentially comprises a ladder network consisting of serially connected identical T-section resistance networks each of the same preselected attenuation loss. The ladder network is terminated by its characteristic or matching impedance. Potentials, representing the digits of a digital number, are fed into one leg of the respective T-section networks and the terminating impedance of the ladder network provides an analogue potential thereacross corresponding to the digital number represented. The accuracy of the converted signal is dependent only upon the accuracy of the input signals, and the resistance values of the attenuation networks. Hence, the overall converter is the essence of simplicity in that its major constituent is a resistance network from which an output analogue potential may be instantaneously derived upon application of input potentials thereto.

This invention also discloses apparatus for converting a digital number into an analogue potential by converting each digit of the digital number into an equivalent potential and them attenuating each of the potentials by a factor determined by the place or column of its respective digit in the digital number. The desired analogue potential is then obtained by a summation of the resultant attenuated signals.

This invention also discloses a specific embodiment of a binary-to-analogue converter and another embodiment of a decimal-to-analogue converter. The principles outlined in conjunction with these two forms may be readily utilized to construct similar converters of other digital number systems.

An object of this invention is to provide an apparatus which transforms a group of signals representing the digits, respectively, of a digital number in a given number system into an equivalent analogue potential by attenuating each of the signals a different amount and then combining the attenuated signals.

Another object of this invention is to provide a digital-to-analogue converter which transforms a digital number into an equivalent analogue potential by representing each of the digits of the number by a separate signal, attenuating each of the signals by a factor determined by its respective digit's place in the number, and then deriving the sum of the attenuated signals to obtain the analogue potential.

Another object of this invention is to provide a device for transforming a plurality of signals representing the digits, respectively, of a decimal number into a single potential which represents an analogue quantity equivalent to the decimal number by attenuating each of the signals by a factor determined by the place of its respective digit in the number and combining the attenuated signals to form the analogue potential.

A further object of this invention is to provide an apparatus which converts signals representing the binary digits respectively, of a binary number into an equivalent analogue potential by attenuating each of the signals by a different predetermined amount and then combining the resultant attenuated signals.

A still further object of this invention is to provide a device which transforms signals representing the digits, respectively, of a number in the decimal number system into a single analogue potential equivalent thereto by attenuating each of the signals a different predetermined amount and combining the attenuated signals.

The novel features which are believed to be characteristic of the invention, both as to its organization and method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only, and are not intended as a definition of the limits of the invention.

Fig. 1 is a circuit diagram of one embodiment of this invention;

Figs. 2*a*–2*d* are waveforms produced by the circuit of Fig. 1; and

Figure 3:
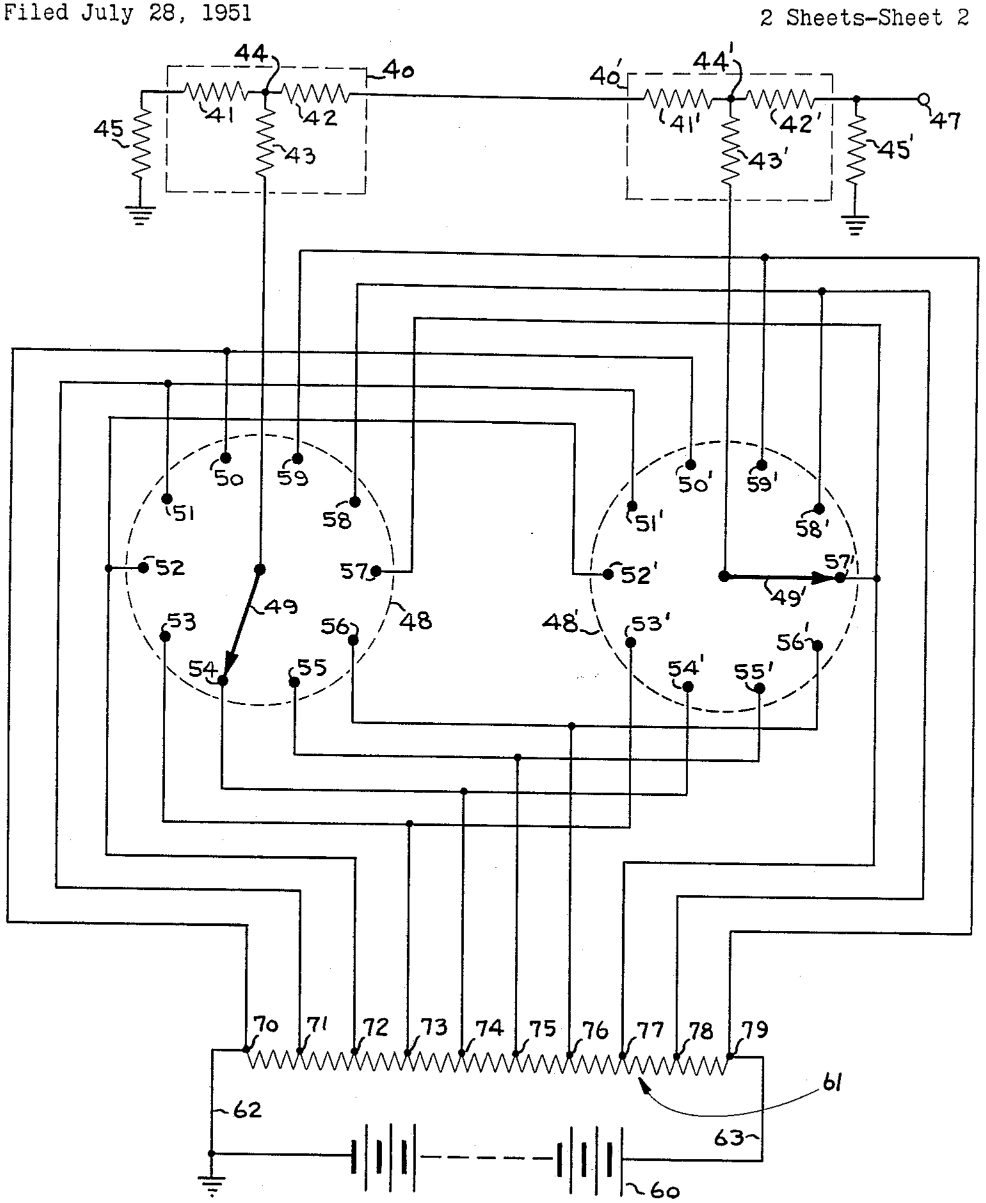

Fig. 3 is another embodiment of this invention.

Fig. 1 illustrates a basic form of a converter, according to this invention, by which a three-place binary number may be converted into an equivalent analogue potential. The converter includes three switches 18, 18′, and 18″, by which three signals representative of the first, second, and third place digits, respectively, of the binary number are applied to a ladder attenuation network. The ladder network comprises three identical serially-connected T-sections, 10, 10′, and 10″, each having two interconnected arms and a leg connected to the junction point of the arms. T-section 10, taken as a typical T-section, consists of two serially-connected resistor arms 11 and 12 and a resistor leg 13 connected to junction point 14 between the arms. Each of these T-sections has an attenuation factor of 2, as measured in conventional fashion across the arms thereof, and the serial type of connection of the ladder network is effected by connecting arm 12 of section 10 to arm 11′ of section 10′, and arm 12′ of section 10′ to arm 11″ of section 10″. The ladder network is terminated at one end by a resistor 16 connected between arm 11 of section 10 and ground, and at the other end by a resistor 16′ connected between arm 12″ of section 10″ and ground. An output terminal 17 is connected to the junction between terminating resistor 16′ and resistor arm 12″ of final T-section 10″.

Switch 18 includes a movable switch arm 20 which may be thrown to contact either fixed contact point 21 or fixed contact point 22. Switch arm 20 of switch 18 is connected to leg 13 of T-section 10 and can thus connect T-section 10 to either fixed contact point 21 or 22. Switches 18′ and 18″ are identical to switch 18 and are connected similarly to attenuation networks 10′ and 10″, respectively. The corresponding fixed contact points 21, 21′, and 21″ of switches 18, 18′, and 18″, respectively, are connected to a grounded bus 24, while the other fixed contact points 22, 22′, and 22″ of the respective switches are tied to a bus 25, connected, in turn, to the positive terminal of a source of direct-current potential, such as a battery 28, on which a potential E appears. The magnitude of potential E from battery 28 is immaterial, the only requirement being that battery 28 maintain a constant output potential under all operating load conditions.

The values of the resistors constituting the individual T-sections, as well as the terminating resistors of the ladder network, should have a definite relationship to one another to thereby provide proper attenuation factors for the signals applied to the ladder from each of the switches. This relationship may be expressed mathematically by stating that the single arm resistors 11, 11′, 11″, 12, 12′, and 12″ of the respective T-sections each have a resistance of 1/2C ohms, where C is a constant determined by considerations to be brought forth later in this disclosure. The legs of resistors 13, 13′, and 13″ of the respective T-sections each have a resistance of 2C ohms, and the resistance of each of the terminating resistors 16 and 16′ is 3/2C ohms. This value of 3/2C ohms for resistors 16 and 16′ is the characteristic resistance of the ladder network composed of arm and leg resistances of the above-cited values.

In operation, the device of Fig. 1 converts a three-place binary number into an analogue potential whose magnitude is proportional to the original binary number. Each switch applies to its associated T-section attenuator, a potential representing a different place digit of the digital number. In this embodiment, a zero potential represents the binary digit 0, while the potential E of battery 28 represents the binary digit 1. Switch 18 may apply either a zero or E potential, corresponding to the binary numbers 0 and 1, respectively, to the ladder network at T-section 10, and this signal represents the units or first place digit of any three-place binary number whose analogue conversion is to be obtained. In a like manner, switch 18′ applies a potential representing the twos digit or second place digit of the binary number, and switch 18″ applies a potential representing the fours or third place digit of the binary number to T-section 10′ and 10″, respectively, of the ladder network.

Figure 2:
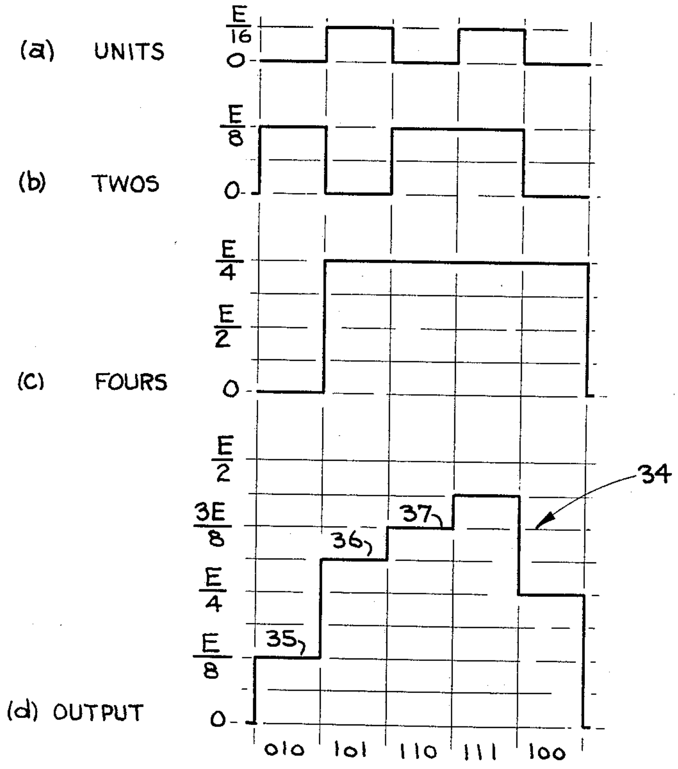

Fig. 2 illustrates the manner by which the apparatus of Fig. 1 effects the digital-to-analogue conversion. In particular, Fig. 2*a* illustrates the potential across resistance 16′ produced by the actuation of switch 18, Fig. 2*b* by the actuation of switch 18′, and Fig. 2*c* by the actuation of switch 18″. Curve 34 of Fig. 2*d* is the potential summation of the wave shapes of Figs. 2*a*–2*c*, and is the output signal of the converter as it appears on terminal 17.

The first step 35 of curve 34 is the converted potential representing binary number 010. This binary number is applied to the ladder network by throwing switch 18 to its grounded switch point 21 whereby the electrical equivalent of the digit 0, constituting the first place digit of the binary number 010, is applied to the ladder. Switch 18′ is thrown to apply the potential E, indicating the twos digit 1 of the binary number 010, to the ladder network, while switch 18″ applies the ground potential to the ladder to indicate the fours binary digit 0 of the same number. Thus, the potential across terminating resistance 16′, in this example, is applied from battery 28 through switch 18′ and is attenuated by the two sections 10′ and 10″ to one-eighth its value, E/8, as illustrated by the first step of Fig. 2*b* and step 35 of waveform 34 of Fig. 2*d*.

This attenuation of the battery potential E to the value E/8 may best be understood by considering the relative resistance values of the network insofar as they affect a signal applied from switch 18′. The current from battery 28 through switch 18′ passes through leg resistance 13′ of T-section 10′ to junction 14′, branches into two parallel paths, one comprising the ladder network to the left thereof, and the other comprising the ladder network to the right thereof. The path to the right of point 14′ includes two resistors 12′ and 11″, each of 1/2C ohms connected serially between point 14′ and 14″. At point 14″, resistor 13″ is connected to ground through switch 18″ which is in parallel with the series combination of resistors 12″ and 16′. Since resistors 12″ and 16′, in series, have a resistance of 2C ohms, their combination in parallel with resistor 13″, also of 2C ohms, provides a total resistance of 1C ohms from the right of point 14″. This 1C ohm resistance, when combined with the total serial resistance of 1C ohms of resistors 12′ and 11″ between points 14′ and 14″, provides a resistance of 2C ohms looking to the right of point 14′. Since the ladder network is symmetrical about this point, the resistance presented by the ladder network to the left of point 14′ is likewise 2C ohms. By reason of the parallel combination of the right and left halves of the network about point 14′, the relative resistance of the network at point 14′ is 1C ohms. The potential E applied by switch 18′ is reduced in value to E/3 at point 14′, since it receives a first attentuation by the 2C ohm resistance of resistor 13′, and a second attenuation by the 1C ohm effective resistance of the ladder network at point 14′. By voltage division, two-thirds of its potential drop occurs across resistor 13′, the remaining one-third, E/3, occurring across the network.

This potential E/3 on point 14′ is further reduced to E/6 at point 14″ by a further voltage division. This division occurs across the 1C resistance of series resistors 12′ and 13′ positioned between points 14′ and 14″ and the 1C resistance between point 14″ and ground through the resistance combination of resistors 13″, 12″, and 16. This potential E/6, appearing on point 14″, is reduced to E/8, the output potential appearing on output terminal 17, by reason of the voltage division between resistor 12″ or 1/2C and resistor 16′ of 3/2C.

The second step 36 of the output waveform 34 is the analogue conversion of the binary number 101, and is obtained by applying potential E to the ladder from switches 18 and 18″ to represent the binary number 1 of the units and fours binary digits, respectively. Switch 18′ applies the ground potential to the ladder to indicate the twos binary digit of 0. The potential component from switch 18 across resistance 16′, as illustrated by the second division of Fig. 2*a*, has the value of E/16, This value may be readily understood by recalling that, in the previous example of step 35, the potential appearing on point 14′ from switch 18′ was attenuated to one-half its value in traveling to point 14″ of the next section 10″. In the same manner, it may be shown that signals appearing on terminal 14, as derived from switch 18, are reduced or attenuated to one-half their former value in traveling to junction 14′. Thus, from the previous example, since the battery potential E as applied to the ladder network from switch 18′ appears as E/8 on output terminal 17, it is manifest that the same potential, applied from switch 18, will appear on output terminal 17 as E/16, it having been serially attenuated by one more T-section. The potential E applied to the ladder by switch 18″, in this example, is attenuated to E/4 as illustrated by the second division of Fig. 2*c*, and may be calculated by using the ladder network resistance values as previously done for step 35 of Fig. 2*d*. The summation of E/16 and E/4, the final attenuated potentials appearing across resistor 16′, as applied by switches 18 and 18″, respectively, is 5/16E, the magnitude of step 36 of waveform 34 as illustrated in Fig. 2*d*.

The remaining steps including step 37, of analogue potential waveform 34, as illustrated in Fig. 2*d*, are formed by throwing the switches so that their respective binary number electrical equivalents are applied to the network, their resultant summation providing the analogue potentials in the manner described for steps 35 and 36.

The choice of the value for constant C for any specific embodiment is determined by several considerations. For example, it is obvious that if the respective switches had no resistance, if battery 28 had no internal resistance, and the output at terminal 17 were fed into an infinite resistance, then C could be arbitrarily set at any value and an accurate conversion attained. If, however, the internal resistance of potential source 28 and the switch resistances are considered, a low value of C would not be satisfactory as the resulting high current will cause potential drops thereacross. These potential drops will vary with the amount of current drawn and thereby cause lack of uniformity between the magnitude of the steps of output waveform 34. Thus, with respect to these two factors, a low value of C is undesirable while a high value is desirable since these undesired potential drops will be insignificant since the current drawn will be extremely small.

On the other hand, C should not be made too high if the load placed on terminal 17 is to be appreciably less than infinite, since the load, being in parallel with resistance 16′, reduces its resistance and consequently disrupts the step magnitude uniformity of the output waveform of Fig. 2*d* by destroying the resistance symmetry of the network. The resistance of resistor 16′, in such a case, could be such that the value of it and the load in parallel equals 3/2C ohms, the established value of resistor 16′ for an infinite load. In any event, the load cannot be less than 3/2C ohms without destroying the resistance symmetry of the network with the resultant destruction of the uniform step characteristic. Thus, C must be small enough that the terminating resistor 16′ in parallel with the given load will not be less than 3/2C.

In practice, then, C must be chosen so as to be relatively large in comparison with the switch resistances and the battery resistance, but, less than the load resistance if a conversion is to be obtained in which a uniform magnitude exists between all steps. However, if, in the utilization of the device, uniform spacing between the analogue steps is not necessary, then the value of C may be arbitrarily chosen.

Although Fig. 1 shows the attenuation sections as being serially interconnected, each input switch could be connected to a separate attenuation section having an attenuation factor equivalent to the attenuation confronted by its input signal in the present embodiment with all of such separate attenuation sections connected to a common output terminal. The illustrated form might be thought of in such a fashion, by, considering switch 18 connected to an attenuation network comprising serially-connected sections 10, 10′ and 10″ and switch 18′ being connected to another attenuation network comprising serially connected 10′ and 10″, etc. In such a case, each of the attenuation networks would be considered as having a common output circuit resistor 16′ and terminal 17. Binary numbers having more than three digital places may be converted into analogue potentials by adding additional T-sections and corresponding switches identical to the ones illustrated to the ladder network until each place of the binary number has a corresponding switch input.

Fig. 3 illustrates a decimal-to-analogue converter capable of transforming a two-place decimal number into an equivalent analogue potential, and is similar in operation to the binary-to-analogue converter of Fig. 1.

The illustrated device in Fig. 3 includes a ladder network formed by serially connecting the two T-networks 40 and 40′, each having a 10:1 attenuation ratio across their arms. The ladder network is terminated at one end by a resistor 45 connected between arm 41 of T-section 40 and ground, and at its other end, by a resistor 45′ connected between arm 42′ of T-section 40′ and ground. An output terminal 47 is connected to the junction between arm 42′ of section 40′ and terminating resistor 45′. Resistors 41, 42, 41′ and 42′ each has a resistance of 9/2C ohms, where C is a constant determined by the same considerations discussed previously in connection with the circuit of Fig. 1. Each of leg resistors 43 and 43′ has a resistance of 10/9C ohms, while terminating resistors 45 and 45′ are of 11/2C ohms. As was the case in Fig. 1, the resistance of each of these terminating resistors 45 and 45′ are equal to the characteristic resistance of the ladder network.

Movable switch arm 49 of a switch 48 is connected to leg 43 of T-section 40, and may be selectively positioned to contact any of fixed switch points 50, 51, 52, . . . 59 of switch 48. Movable switch arm 49′ of switch 48′, identical to switch 48, is connected to leg 43′ of T-section 40′ and may make selective contact with any of the fixed switch points 50′, 51′, 52′ . . . 59′ of switch 48′. A resistor 61 is connected across a battery 60, and is tapped at equidistant points 70, 71, 72, 73 . . . 79 to provide equal potential differences between any two consecutive tapped points. Tapped point 70, which is connected to the negative or ground terminal of battery 60, is connected to fixed switch point 50 of switch 48, and to fixed switch point 50′ of switch 48′ and the potential applied thereto represents the decimal number 0. Tapped point 71, positioned next to tapped point 70, is connected to fixed switch point 51 of switch 48 and fixed switch point 51′ of switch 48′, and the potential between points 70 and 71 represents the decimal digit 1. In a like manner, the remaining consecutive tapped points of resistor 61 are connected to consecutive fixed switch points of switches 48 and 48′, respectively, and apply potentials thereto indicative of the remaining consecutive decimal digits. Thus, the final tapped point 79, which is connected to the positive terminal of battery 60, is connected to final fixed switch points 59 and 59′ of switches 48 and 48′, respectively, and applies thereto, a potential representing the highest decimal digit 9. The resistance of resistor 61 is negligible in comparison to the resistance of the ladder network measured between any movable switch arm input and ground so that variations of current drawn by the network due to different switch positions will not affect the magnitudes of the applied potentials.

This decimal converter may convert any two place decimal number from 0 to 99 into an equivalent analogue potential. This result is accomplished in a manner similar to that set forth in connection with the converter of Fig. 1, and is not set forth in detail, since such a discussion would primarily involve a repetition of that presented previously.

Briefly, switch 48 applies a potential to attenuating section 40 of the ladder network representing the units digit, or first place digit, of a decimal number by making conductive contact between movable switch arm 49 and the fixed switch point on which the potential representing the particular decimal number of the units digit appears. In the same manner, switch 48′ applies a potential equivalent to the tens digit, or second place digit, of the same decimal number to T-section 40′ of the ladder network.

The potential applied to the network by switch arm 49 of switch 48 is attenuated to 45/55 of its value at junction 44 which, in turn, is attenuated to 45/550 or 9/110 of its original value at junction 44′. The output signal appearing on terminal 47 from switch 48 receives a final attenuation between junction 44′ and terminal 47 and appears thereon as 45/1000 of its original value. In the same manner, the potential applied from switch arm 49′ of switch 48′ is attenuated to 45/100 of its original value at output terminal 47. The determination of these attenuation values may be quite readily ascertained by calculations performed as illustrated in connection with Fig. 1 but using resistance values cited above for this embodiment. The output potential appearing across resistor 45′ on terminal 47 is the summation of the two attenuated signals and represents the equivalent analogue potential of the decimal number input.

The accuracy of conversion of the embodiments of Figs. 1 and 3, as well as for similar converters constructed for other radix number systems, is limited primarily by the accuracy of attenuation provided by the individual attenuation sections of the respective ladder networks. Variation of attenuation values between T-sections will cause loss of proportionality or non-linearity between the magnitude of the input numbers and the output analogue potential. Also, the attenuation factors of all sections should be as close as possible to the radix of the number system whose conversion is desired so as to avoid other undesirable results. For example, in Fig. 1, if the attenuation ratio of all the sections were slightly less than 2:1, the signals placed on the earlier stages would be relatively less attenuated than would be the signals placed on the later stages due to the exponential form of attenuation of the overall network. If the effect is quite pronounced, then some of the higher output analogue levels will merge with one another and the conversion of two different digital numbers produce the identical output signal. Obviously, such a result is highly undesirable. On the other hand, if the attenuation ratios of all sections are more than 2:1, the signals applied to the earlier stages will be relatively more attenuated than signals applied to the later stages and will result in non-linearity between the input digital numbers and the output analogue signal by causing non-uniform jumps between consecutive analogue potential levels corresponding to consecutive digital inputs. This non-linearity is also undesirable for a majority of the envisioned uses of the conversion output of this invention. Each of these undesirable results as produced by attenuation variation may be reduced to a minimum by carefully matching the attenuation values of the respective T-sections.

It should also be pointed out that since the later attenuation sections have an exponentially increasingly greater effect on the magnitude of the output potential, their effect on the accuracy of the analogue output is also increasingly more important. Hence, for the most satisfactory conversion, at least the later attenuation sections of the network should have attenuation factors as nearly equal, as possible, to the radix of the number system whose conversion is effected.

As will be obvious to those skilled in the art, the circuits illustrated in Figs. 1 and 3 may take other forms without departing from the scope and spirit of this invention. For example, additional stages may be added to effect a larger digital number conversion, the sections thus added being similar in all respects to the sections illustrated in the respective figures. As is also apparent, digital numbers of any *r*-radix number system may be converted into analogue potentials by appropriate structure constructed in accordance with the practice outlined here in connection with Figs. 1 and 3.

The combination of a battery with switches to provide potential inputs representing digits of the numbers to be converted is only one form by which such inputs to the ladder may be obtained. For example, the signal inputs to the binary converter of Fig. 1 may well be derived from a series of flip-flops, such as a shifting register circuit, in which the two flip-flop output levels of each flip-flop represent the two binary digits, respectively. The outputs from the consecutive flip-flops, in such a case, would be coupled to the legs of the consecutive T-sections of the ladder network instead of the movable switch arms as are now connected. As is also apparent, relay circuits could also be substituted for the flip-flop circuits. Binary and other radix number system input signals may also be obtained directly from storage or memory devices of the type employed in digital computers. As will also be apparent to those skilled in the art, the batteries, as illustrated by way of example in the two embodiments, may be replaced by well-regulated power supplies and the manually actuated switches replaced by motor actuated ones without departing from the scope and spirit of this invention.

What is claimed as new is:

1. In a computer system wherein digital numbers, containing a plurality of digits according to a predetermined radix, are represented by constant potential signals having values proportional to the corresponding digits, a device for converting a digital number into an analogue signal, said device comprising: a plurality of attenuation sections having a common output circuit, one section for each of the plurality of digits, each of said sections having an input terminal and providing successively higher attenuations corresponding to the digital place in the number, the constant potential signals being applied directly to said input terminals, respectively, the potential appearing on said output circuit representing an analogue conversion of the digital number.

2. The device of claim 1 wherein the radix is equal to 2, the constant potential signals having one value for representing the digital value of 0 and another value for representing the digital value of 1, each of said sections providing an attenuation twice that of the section corresponding to the next lower digital place and one-half that of the section corresponding to the next higher digital place.

3. The device of claim 1 wherein the radix is equal to 10, the constant potential signals having a fixed reference value for representing the digital value of zero, and having values increased by 1, 2, . . . 9 equal voltage increments for representing the digital values of 1, 2, . . . 9, respectively, each of said sections providing an attenuation ten times that of the section corresponding to the next lower digital place and one-tenth that of the section corresponding to the next higher digital place.

4. In a computer system wherein digital numbers, containing a plurality of digits according to a predetermined radix, are represented by constant potential signals having values proportional to the corresponding digits, a device for converting a digital number into an analogue signal, said device comprising: a ladder network including a plurality of serially connected sections each having an attenuation equal to the radix, each of said sections having an input terminal and the final section having an output terminal, the constant potential signals being applied directly to said input terminals, respectively, the potential appearing on said output terminal representing an analogue conversion of the digital number.

5. In a computer system wherein 1st, 2d, . . . *n*th constant potential signals represent, respectively, 1st, 2d, . . . *n*th digits in corresponding places of a digital number, the value of each constant potential signal as measured from a common reference being proportional to the value of the corresponding digit, said number having a predetermined radix; a device for converting the number into an equivalent analogue potential, said device comprising: 1st, 2d, . . . *n*th serially connected attenuation sections containing, respectively, 1st, 2d, . . . *n*th interconnected pairs of arms and 1st, 2d, . . . *n*th legs having one end connected to the junction of the corresponding pairs of arms, said *n*th section having, in addition, an output terminal, the attenuation factor of each of said sections being equal to the radix, the 1st, 2d, . . . *n*th constant potential signals being applied directly to the other ends of said 1st, 2d, . . . *n*th legs, respectively, the potential appearing on said output terminal representing the analogue conversion of the digital number.

6. The device of claim 5 wherein the radix is equal to 2, each of said arms includes a resistor having a value of C/2 ohms, and each of said legs includes a resistor having a value of 2C ohms, where C is a constant.

7. The device of claim 5 wherein the radix is equal to 10, each of said arms includes a resistor having a value of 9/2C ohms, and each of said legs includes a resistor having a value of 10/9C ohms, where C is a constant.

References Cited in the file of this patent

UNITED STATES PATENTS

| | | |
|---|---|---|
| 2,537,427 | Seid et al. | Jan. 6, 1951 |

FOREIGN PATENTS

| | | |
|---|---|---|
| 493,517 | Germany | Mar. 8, 1930 |

OTHER REFERENCES

"Electronic Instruments," Greenwood, Holdam and MacRae; McGraw-Hill, 1948. Pages 41 and 42, and Figs. 3, 9 relied upon.

"Theory and Techniques for Design of Electronic Digital Computers," vol. III; University of Pennsylvania; Moore School of Electrical Engineering, Philadelphia, June 30, 1948, pp. 33–11 to 33–13 and Figure 7, drawing PY–O–144A.